(12) United States Patent
Mata

(10) Patent No.: US 11,898,592 B1
(45) Date of Patent: Feb. 13, 2024

(54) ALUMINUM CABINET SYSTEM

(71) Applicant: Frank Mata, Miami, FL (US)

(72) Inventor: Frank Mata, Miami, FL (US)

(*) Notice: Subject to any disclaimer, the term of this patent is extended or adjusted under 35 U.S.C. 154(b) by 0 days.

(21) Appl. No.: 18/167,008

(22) Filed: Feb. 9, 2023

(51) Int. Cl.
| | | |
|---|---|---|
| *A47B 47/00* | (2006.01) | |
| *F16B 5/00* | (2006.01) | |
| *F16B 12/30* | (2006.01) | |
| *A47B 47/02* | (2006.01) | |

(52) U.S. Cl.
CPC ............ *F16B 5/0012* (2013.01); *A47B 47/02* (2013.01); *A47B 47/0075* (2013.01)

(58) Field of Classification Search
CPC ... A47B 47/0075; A47B 47/02; A47B 96/201; A47B 96/205; A47B 47/025; F16B 5/0012; F16B 12/30
See application file for complete search history.

(56) References Cited

U.S. PATENT DOCUMENTS

| | | | | |
|---|---|---|---|---|
| 6,027,192 A | * | 2/2000 | Irace | A47B 96/021 |
| | | | | 312/263 |
| 6,099,095 A | * | 8/2000 | Irace | A47B 47/02 |
| | | | | 312/265.5 |
| 6,357,610 B1 | * | 3/2002 | Irace | A47B 47/02 |
| | | | | 211/186 |
| 6,409,293 B1 | * | 6/2002 | Chang | A47B 88/941 |
| | | | | 312/265.5 |
| 9,326,600 B1 | * | 5/2016 | Reynolds | A47B 57/44 |
| 10,264,882 B1 | * | 4/2019 | Lai | A47B 96/04 |
| 10,648,497 B2 | * | 5/2020 | Goelst | F16B 5/0044 |
| 2017/0370391 A1 | * | 12/2017 | Goelst | A47B 47/02 |
| 2018/0094664 A1 | * | 4/2018 | Lai | F16B 12/30 |

FOREIGN PATENT DOCUMENTS

| | | | | |
|---|---|---|---|---|
| CA | 2321470 A1 | * | 3/2002 | ............ A47B 47/02 |
| EP | 2997854 A1 | * | 3/2016 | ............ A47B 47/02 |
| KR | 101339341 B1 | * | 12/2013 | |

* cited by examiner

*Primary Examiner* — Kimberley S Wright
(74) *Attorney, Agent, or Firm* — Ruben Alcoba, Esq.

(57) ABSTRACT

An aluminum cabinet system that will withstand time and the elements while at the same time being fanciful. The aluminum cabinet system is composed of modular panels and bars that can be easily assembled in indoor and outdoor locations. The cabinet system uses a unique connection to connects and locks the modular panels to each other.

8 Claims, 5 Drawing Sheets

ALUMINUM CABINET SYSTEM

TECHNICAL FIELD

The present invention pertains to an aluminum cabinet system.

BACKGROUND

The inventor of the present invention is a fabricator of aluminum cabinets and innovated the fabrication of aluminum cabinets for kitchens, bathrooms, and outdoor installations of grills.

The inventor of the present invention devised the present invention so that it would be a cabinet system that he could sell based on a lifetime guarantee of the structure.

The cabinet system had to be stylish, yet everlasting.

The cabinet system had to be easy to install so that human error would damage the cabinet system during installation.

The cabinet system would be able to withstand the elements and time.

The cabinet system had to be modular so that the size of the cabinet system could be easily modified based on the location wherein the cabinet system would be installed.

The present invention is designed to be a modular aluminum cabinet system that will withstand time and the elements while at the same time being fanciful.

SUMMARY

The present invention is directed to a modular aluminum cabinet system that withstands time and the elements while at the same time being fanciful.

The aluminum cabinet system comprises of three left rectangular panels, at least three middle rectangular panels, and three right rectangular panels, the left, middle and right rectangular panels attach to each other perpendicularly. And, a left top stretch bar that connects the first left rectangular panel to the third rectangular panel, and a right top stretch bar that connects the first right rectangular panel to the third right rectangular panel. An embodiment of the present invention can further comprise of at least two left legs that attach to a bottom side of one of the left rectangular panels, and of at least two right legs that attach to a bottom side of one of the second right rectangular panels. The rectangular panels of the aluminum cabinet system use a new attachment system to fixedly attach to each other. The aluminum cabinet system also uses a principle of weight distribution to connect the side walls of the aluminum cabinet system to a bottom wall of the aluminum cabinet system.

An object of the present invention is to provide an aluminum cabinet system that is easy to install.

Another object of the present invention is to provide an aluminum cabinet system that will not deform with time.

Yet another object of the present invention is to provide an aluminum cabinet system that is stylish.

A further object of the present invention is to provide an aluminum cabinet system that will withstand the elements.

Yet a further object of the present invention is to provide a modular aluminum cabinet system.

BRIEF DESCRIPTION OF THE DRAWINGS

These and other features, aspects, and advantages of the present invention will become better understood with regards to the following description, appended claims, and drawings where:

DESCRIPTION

Figure 1:
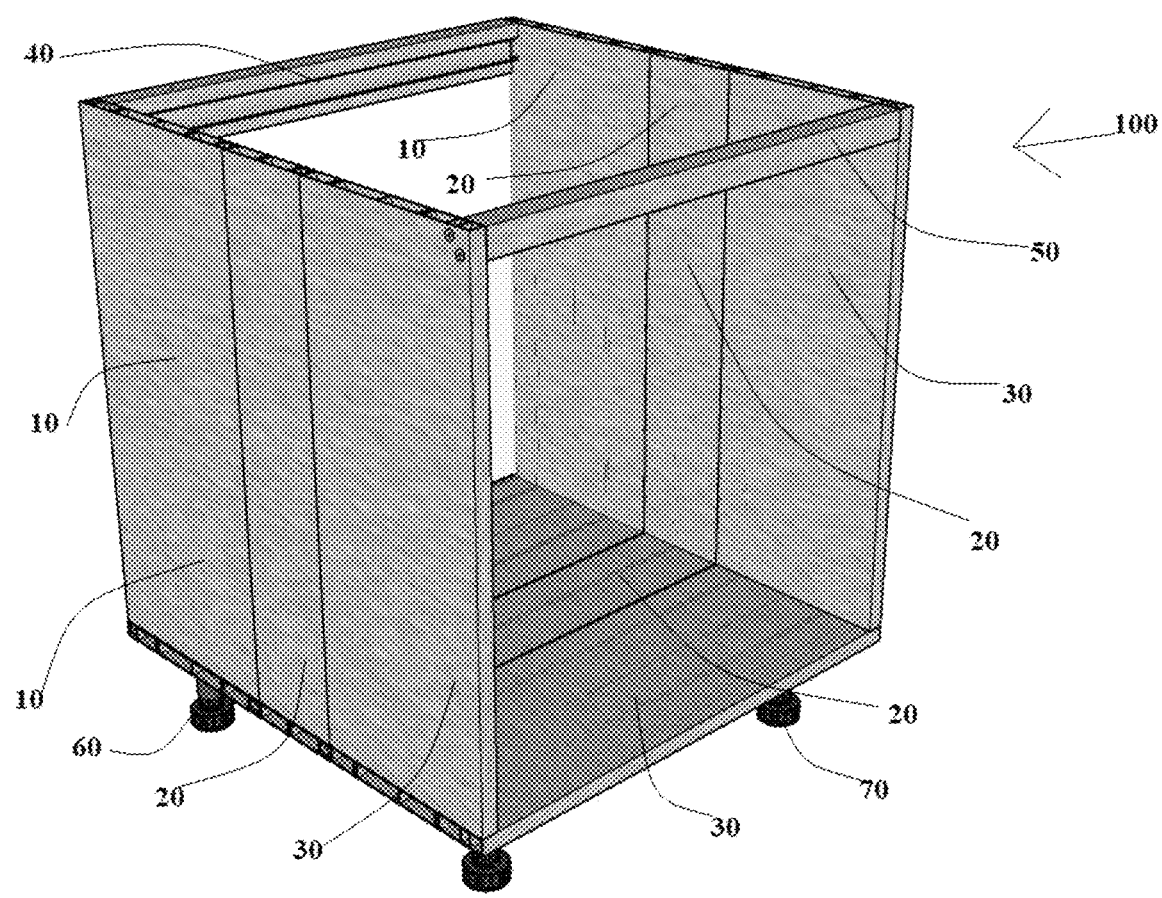
FIG. 1 is a perspective view of the present invention.
Figure 2:
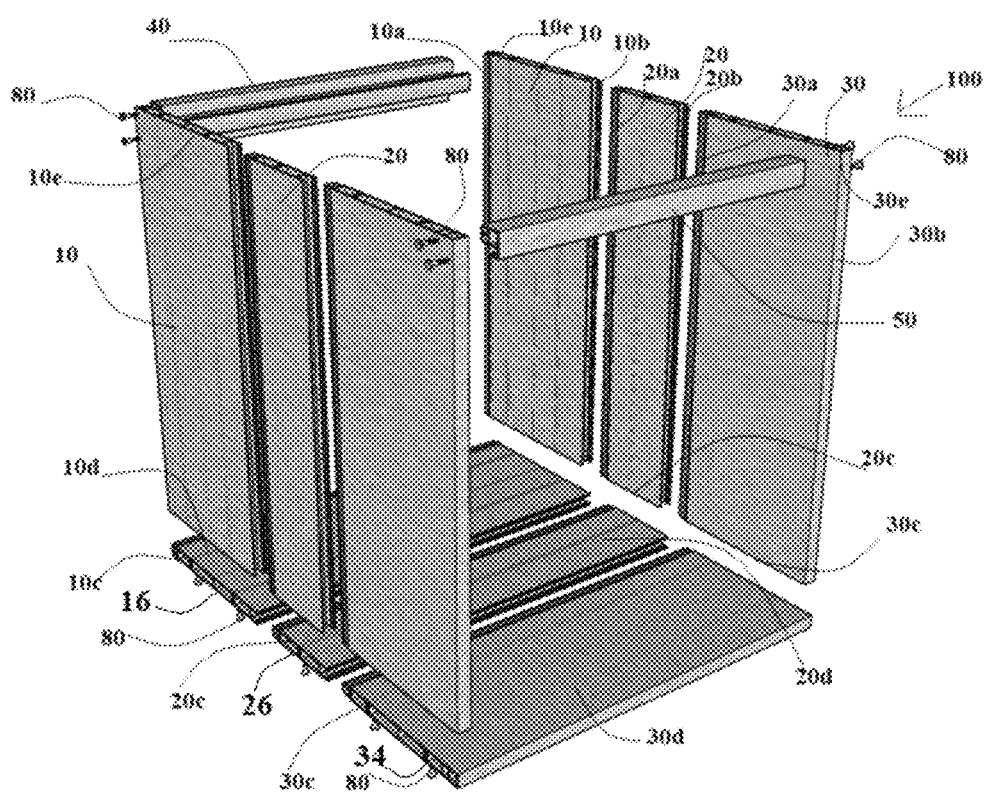
FIG. 2 is an exploded perspective view of the present invention highlighting a top to bottom view.
Figure 3:
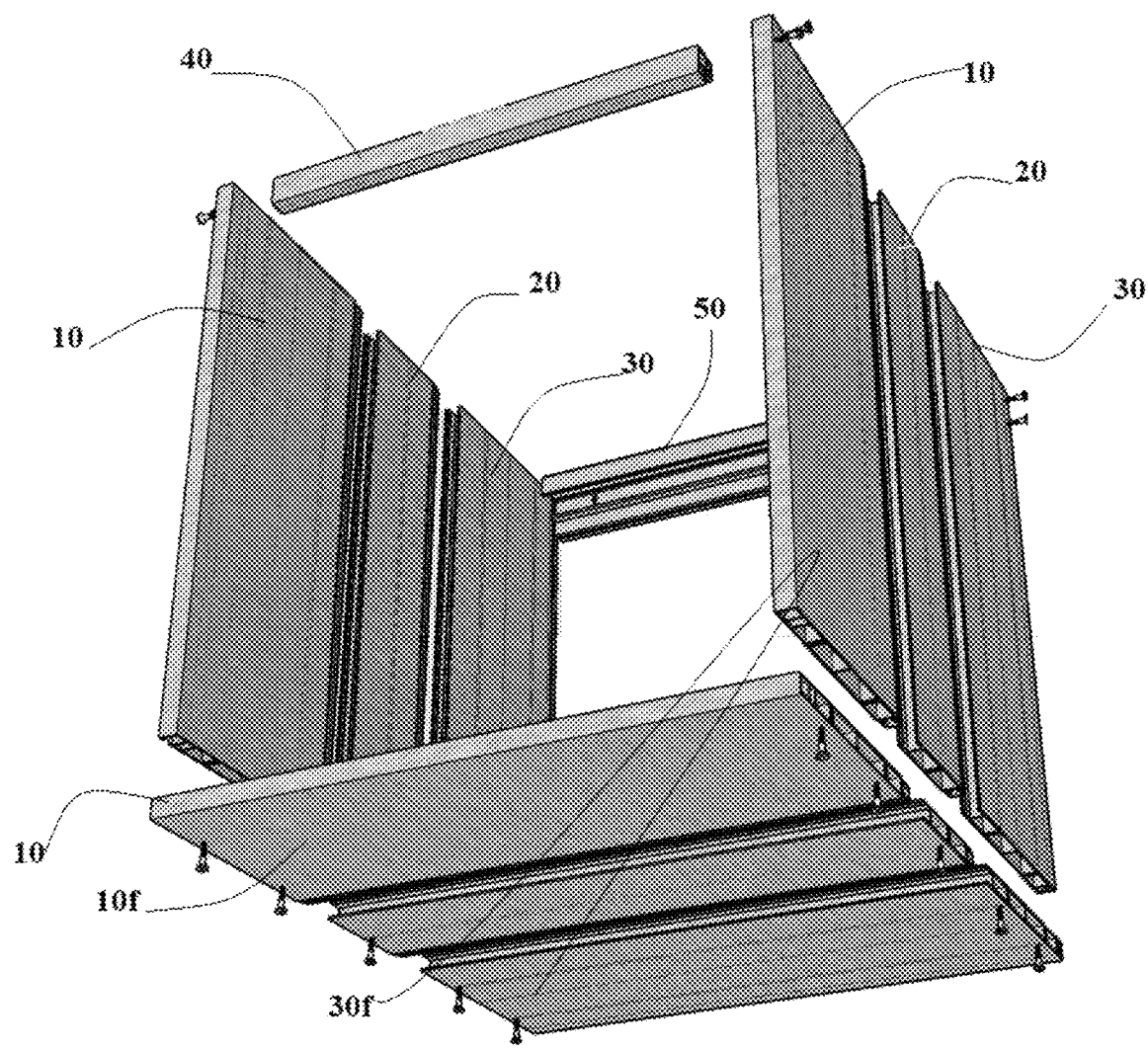
FIG. 3 is an exploded perspective view of the present invention highlighting a bottom to top view.
Figure 4:
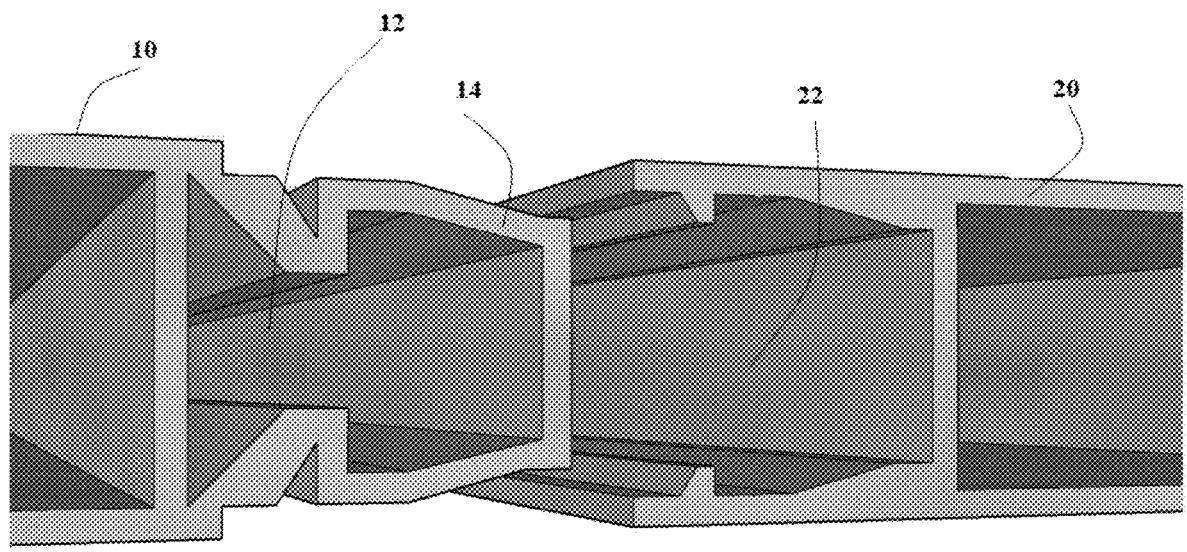
FIG. 4 is a perspective view that shows how the verticals walls of the rectangular panels connect to each other.
Figure 5:
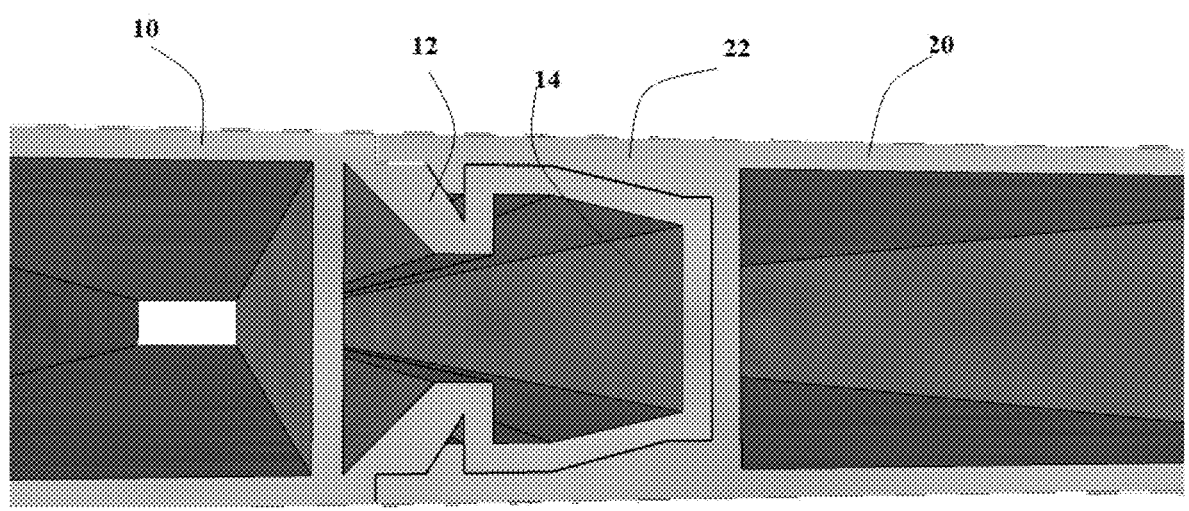
FIG. 5 is a perspective view that shows how the vertical walls of the rectangular panels fit when connected to each other.
Figure 6:
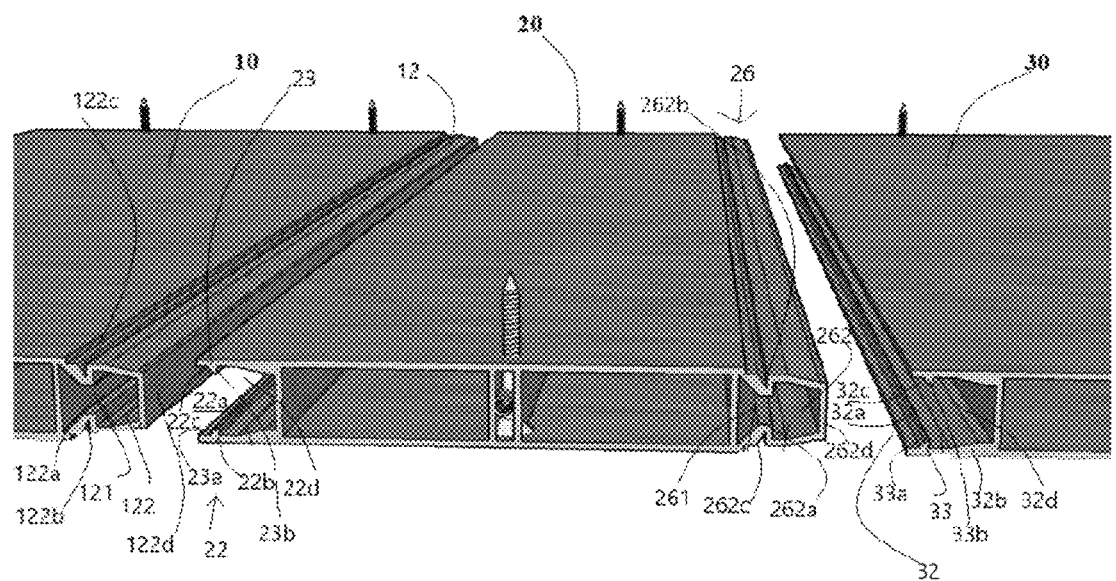
FIG. 6 is a side view that shows how the vertical walls of all of the rectangular panels attach to each other.
Figure 7:
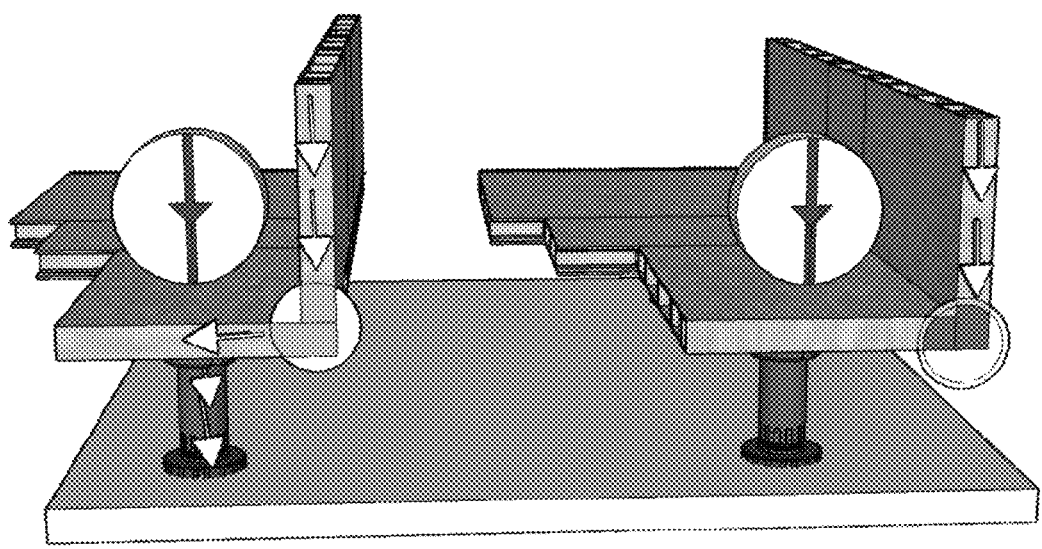
FIG. 7 is a perspective view that compares the weight distribution of the side walls of the present invention that is compared to the normal weight distribution of side walls in the present art of making cabinets.

As seen in FIGS. 1-7, the present invention is a modular aluminum cabinet system that withstands time and the elements while at the same time being fanciful.

The aluminum cabinet system 100 comprises three left rectangular panels 10, a left side 10a of each left rectangular panel 10 has a flat side wall 10a, a right side 10b of each left rectangular panel 10 has a male connection member 12 that has a head 14, wherein the head 12 has a first section 121 and a second section 122, the first section 121 tapers inward until reaching a mid-position 122a of the second section 122, a rear part 122b of the rear section 122 extends outward from the mid-position 122a to an outward position thereby forming an acute angle 122c between the first section 121 and a rear part 122b of the second section 122 of the head 12, and the second section 122 of the head 12 tapers inward until reaching a front side 122d of the head 12 the male connection member 12 runs along a vertical length of the right side 10b of each left rectangular panel 10, a posterior side 10c of each left rectangular panel 10 is flat and has at least two screw receiving points 16 that are configured to receive a screw 80 when the posterior side 10c of a first and a third left rectangular panel 10 is perpendicularly mounted and attached to a top side 10d of a second left rectangular panel 10. At least three middle rectangular panels 20, a left side 20a of each left rectangular panel 20 has a female one way receiver 22, wherein the female one way receiver 22 has an open end 22a, the female one way receiver 22 defines two inner abutments 23 that extend from a pair of side walls 22b of the one way receiver 22, the two inner abutments 23 are on a same plane, a first side 23a of the two inner abutments 23 tapper inwards from the pair of side walls 22b of the female one way receiver 22 thereby forming a obtuse angle 22c between each side of the pair of side walls 22b and the first side 23a of the two inner abutments 23, and a second side 23b of the two inner abutments 23 extend outward toward each of the pair of side walls 22b of the one way receiver 22, the one way receiver 22 defines an aperture 22d that receives the second section 122 of the head 12, the female one way receiver 22 runs along a vertical length of the left side 20a of each middle rectangular panel 20 and is configured to receive either the male connection member 12 of one of the left rectangular panels 10 or to a male connection member 24 of a middle rectangular panel 20, a right side 20b of each middle rectangular panel 20 has the male connection member 24 that has a head 26, wherein the head 26 has a first section 261 and a second section 262, the first section 261 tapers inward until reaching a mid-position 262a of the second section 262, a rear part 262b of the rear section 262 extends outward from the mid-position 262a to an outward position thereby forming an acute angle 262c between the first section 261 and a rear part 262b of the second section 262 of the head 26, and the second section 262 of the head 26 tapers inward until reaching a front side 262d of the head 26, the male connection member 24 runs along a vertical length of the right side 20b of each middle rectangular panel 20 and is configured to insert to either the female one way receiver 22 of one of the middle rectangular panels 20 or to a female one way receiver 32 of a right rectangular panel 30, a posterior side 20c of each middle rectangular panel 20 is flat and has at least two screw receiving points 24 that are configured to receive a screw 80 when the posterior side 20c of a first and a third middle rectangular panel 20 is perpendicularly mounted and attached to a top side 20d of a second middle rectangular panel 20. Three right rectangular panels 30, a right side 30b of each right rectangular panel 30 has a flat side wall, a left side 30a of each right rectangular panel 30 has the female one way receiver 32, wherein the female one way receiver 32 has an open end 32a, the female one way receiver 32 defines two inner abutments 33 that extend from a pair of side walls 32b of the one way receiver 32, the two inner abutments 33 are on a same plane, a first side 33a of the two inner abutments 33 tapper inwards from the pair of side walls 32b of the female one way receiver 32 thereby forming a obtuse angle 32c between each side of the pair of side walls 32b and the first side 33a of the two inner abutments 33, and a second side 33b of the two inner abutments 33 extend outward toward each of the pair of side walls 32b of the one way receiver 32, the one way receiver 32 defines an aperture 32d that receives the second section 262 of the head 26, the female one way receiver 32 runs along a vertical length of the left side 30a of each right rectangular panel 30, the female one way receiver 32 is configured to receive the male connection member 24 of the middle rectangular panel 20, a posterior side 30c of each right rectangular panel 30 is flat and has at least two screw receiving points 34 that are configured to receive a screw 80 when the posterior side 30c of a first and a third right rectangular panel 30 is perpendicularly mounted and attached to a top side 30d of a second right rectangular panel 30. A left top stretch bar 40 that connects to an anterior section 10e of the first left rectangular panel 10 to an anterior section 10e of the third rectangular panel 10. And, a right top stretch bar 50 that connects to an anterior section 30e of the first right rectangular panel 30 to an anterior section 30e of the third right rectangular panel 30.

In an embodiment of the present invention comprises of at least two left legs 50 that attach to a bottom side 10f of the second left rectangular panel 10, and of at least two right legs 60 that attach to a bottom side 30f of the second right rectangular panel 30.

In another embodiment of the present invention, the length of the anterior and the posterior sides 10c of each left rectangular panel 10 is at least 8 inches, wherein the length of the posterior side 20c of each middle rectangular panel 20 is at least 4 inches, wherein the length of the posterior side 30c of each right rectangular panel 30 is at least 8 inches, and wherein the left 10, the middle 20, and the right 30 rectangular panels have a height that is at least 12 inches.

In yet another embodiment of the present invention, the length of the posterior side 10c of each left panel 10 is 12 inches, wherein the length of the posterior sides 20c of each middle rectangular panel 20 is at least 4 inches, wherein the length of the posterior side 30c of each right rectangular panel 30 is at least 12 inches, and wherein the left 10, the middle 20, and the right 30 rectangular panels have a height that is at least 12 inches.

In still yet another embodiment of the present invention, the length of the posterior side 10a of each left rectangular panel 10 is 16 inches, wherein the length of the posterior side 20a of each middle rectangular panel 20 is at least 4 inches, wherein the length of the posterior side 30a of each right rectangular panel 30 is 16 inches, and wherein the left 10, the middle 20, and the right 30 rectangular panels have a height that is at least 12 inches.

In a further embodiment of the present invention, the length of the posterior side 10c of each left rectangular panel 10 is 20 inches, wherein the length of the posterior side 20a of each middle rectangular panel 20 is at least 4 inches, wherein the length of the posterior side 30a of each right rectangular panel 30 is 20 inches, and wherein the left 10, the middle 20, and the right 30 rectangular panels have a height that is at least 12 inches.

In yet a further embodiment of the present invention, the left 10, the middle 20, and the right 30 rectangular panels attach to each other via a plurality of screws 80.

In yet still a further embodiment of the present invention, there are six of the at least three middle rectangular panels 20.

An advantage of the present invention is that it provides an aluminum cabinet system that is easy to install.

Another advantage of the present invention is that it provides an aluminum cabinet system that does not deform with time.

Yet another advantage of the present invention is that it provides an aluminum cabinet system that is stylish.

A further advantage of the present invention is that it provides an aluminum cabinet system that withstands the elements.

Yet a further advantage of the present invention is that it provides a modular aluminum cabinet system.

The embodiments of the aluminum cabinet system described herein are exemplary and numerous modifications, combinations, variations, and rearrangements can be readily envisioned to achieve an equivalent result, all of which are intended to be embraced within the scope of the appended claims. Further, nothing in the above-provided discussions of the aluminum cabinet system should be construed as limiting the invention to an embodiment or a combination of embodiments. The scope of the invention is defined by the description, drawings, and claims.

What is claimed is:

1. A modular aluminum cabinet system that withstands time and the elements while at the same time being fanciful, the modular aluminum cabinet system comprises:

three left rectangular panels, a left side of each left rectangular panel has a flat side wall, a right side of each left rectangular panel has a male connection member that has a head, wherein the head has a first section and a second section, the first section tapers inward until reaching a mid-position of the second section, a rear part of the rear section extends outward from the mid-position to an outward position thereby forming an acute angle between the first section and a rear part of the second section of the head, and the second section of the head tapers inward until reaching a front side of the head, the male connection member runs along a vertical length of the right side of each left rectangular panel, a posterior side of each left rectangular panel is flat and has at least two screw receiving points that are configured to receive a screw when the posterior side of a first and a third left rectangular panel is perpendicularly mounted and attached to a top side of a second left rectangular panel;

at least three middle rectangular panels, a left side of each middle rectangular panel has a female one way receiver, wherein the female one way receiver has an open end, the female one way receiver defines two inner abutments that extend from a pair of side walls of the one way receiver, the two inner abutments are on a same plane, a first side of the two inner abutments tapper inwards from the pair of side walls of the female one way receiver thereby forming a obtuse angle between each side of the pair of side walls and the first side of the two inner abutments, and a second side of the two inner abutments extend outward toward each of the pair of side walls of the one way receiver, the one way receiver defines an aperture that receives the second section of the head, the female one way receiver runs along a vertical length of the left side of each middle rectangular panel and is configured to receive either the male connection point of one of the left rectangular panels or to a male connection point of a middle rectangular panel, a right side of each middle rectangular panel has the male connection point that has a head, wherein the head has a first section and a second section, the first section tapers inward until reaching a mid-position of the second section, a rear part of the rear section extends outward from the mid-position to an outward position thereby forming an acute angle between the first section and a rear part of the second section of the head, and the second section of the head tapers inward until reaching a front side of the head, the male connection point runs along a vertical length of the right side of each middle rectangular panel, and is configured to insert to either the female one way receiver of one of the middle rectangular panels or to a female one way receiver of a right rectangular panel, a posterior side of each middle rectangular panel is flat and has at least two screw receiving points that are configured to receive a screw when the posterior side of a first and third middle rectangular panel is perpendicularly mounted and attached to a top side of a second middle rectangular panel;

three right rectangular panels, a right side of each right rectangular panel has a flat side wall, a left side of each right rectangular panel has the female one way receiver, wherein the female one way receiver has an open end, the female one way receiver defines two inner abutments that extend from a pair of side walls of the one way receiver, the two inner abutments are on a same plane, a first side of the two inner abutments tapper inwards from the pair of side walls of the female one way receiver thereby forming a obtuse angle between each side of the pair of side walls and the first side of the two inner abutments, and a second side of the two inner abutments extend outward toward each of the pair of side walls of the one way receiver, the one way receiver defines an aperture that receives the second section of the head, the female one way receiver runs along a vertical length of the left side of each right rectangular panel, the female one way receiver is configured to receive the male connection member of the middle rectangular panel, a posterior side of each right rectangular panel is flat and has at least two screw receiving points that are configured to receive a screw when the posterior side of a first and a third right rectangular panel is perpendicularly mounted and attached to a top side of a second right rectangular panel;

a left top stretch bar that connects to an anterior section of the first left rectangular panel to an anterior section of the third rectangular panel; and a right top stretch bar that connects to an anterior section of the first right rectangular panel to an anterior section of the third right rectangular panel.

2. The modular aluminum cabinet system that withstands time and the elements while at the same time being fanciful of claim 1, the modular aluminum cabinet system comprises of at least two left legs that attach to a bottom side of the second left rectangular panel, and of at least two right legs that attach to a bottom side of the second right rectangular panel.

3. The modular aluminum cabinet system that withstands time and the elements while at the same time being fanciful of claim 2, wherein the length of the posterior side of each left rectangular panel is at least 8 inches, wherein the length of the posterior side of each middle rectangular panel is at least 4 inches, wherein the length of the posterior side of each right rectangular panel is at least 8 inches, and wherein the left, the middle, and the right rectangular panels have a height that is at least 12 inches.

4. The modular aluminum cabinet system that withstands time and the elements while at the same time being fanciful of claim 1, wherein the length of the posterior side of each left rectangular panel is 12 inches, wherein the length of the posterior side of each middle rectangular panel is at least 4 inches, wherein the length of the posterior side of each right rectangular panel is at least 12 inches, and wherein the left, the middle, and the right rectangular panels have a height that is at least 12 inches.

5. The modular aluminum cabinet system that withstands time and the elements while at the same time being fanciful of claim 1, wherein the length of the posterior side of each left rectangular panel is 16 inches, wherein the length of the posterior side of each middle rectangular panel is at least 4 inches, wherein the length of the posterior side of each right rectangular panel is 16 inches, and wherein the left, the middle, and the right rectangular panels have a height that is at least 12 inches.

6. The modular aluminum cabinet system that withstands time and the elements while at the same time being fanciful of claim 1, wherein the length of the posterior side of each left rectangular panel is 20 inches, wherein the length of the posterior side of each middle rectangular panel is at least 4 inches, wherein the length of the posterior side of each right rectangular panel is 20 inches, and wherein the left, the middle, and the right rectangular panels have a height that is at least 12 inches.

7. The modular aluminum cabinet system that withstands time and the elements while at the same time being fanciful of claim 1, wherein the left, the middle, and the right rectangular panels attach to each other via a plurality of screws.

8. The modular aluminum cabinet system that withstands time and the elements while at the same time being fanciful of claim 1, wherein there are six of the at least three middle rectangular panels.

* * * * *